(12) United States Patent
Dobson et al.

(10) Patent No.: US 7,261,488 B2
(45) Date of Patent: Aug. 28, 2007

(54) BALL SOCKET RING SEAL

(75) Inventors: Kenneth S. Dobson, Chicago, IL (US);
Robert K. Dutzi, Palatine, IL (US);
Dennis M. Mark, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 3 days.

(21) Appl. No.: 10/831,447

(22) Filed: Apr. 23, 2004

(65) Prior Publication Data

US 2005/0051974 A1    Mar. 10, 2005

Related U.S. Application Data

(60) Provisional application No. 60/501,284, filed on Sep. 9, 2003.

(51) Int. Cl.
*F16J 15/52* (2006.01)
*F16C 11/00* (2006.01)

(52) U.S. Cl. .................. 403/133; 403/140; 403/141; 277/635

(58) Field of Classification Search ........ 403/133–135, 403/140–141; 277/634–635
See application file for complete search history.

(56) References Cited

U.S. PATENT DOCUMENTS

| | | | | |
|---|---|---|---|---|
| 2,759,777 A | * | 8/1956 | Anderson ................... 384/487 |
| 3,124,502 A | * | 3/1964 | Radke ....................... 428/66.4 |
| 3,588,201 A | * | 6/1971 | Schmidt ..................... 384/146 |
| 3,723,995 A | | 4/1973 | Baumann ........................ 3/1 |
| 3,848,938 A | * | 11/1974 | Stella et al. ................ 384/146 |
| 3,850,047 A | * | 11/1974 | Davis ....................... 74/473.34 |
| 4,230,415 A | * | 10/1980 | Scheerer .................... 403/122 |
| 4,331,367 A | | 5/1982 | Trudeau et al. .............. 308/26 |
| 4,435,101 A | * | 3/1984 | Sugiyama et al. .......... 403/122 |
| 4,444,466 A | | 4/1984 | Deshaw ..................... 350/289 |
| 4,519,268 A | * | 5/1985 | Oda ........................ 74/473.34 |
| 4,712,940 A | | 12/1987 | Wood, Jr. ................... 403/133 |
| 4,768,889 A | * | 9/1988 | Loser et al. ................. 384/145 |
| 5,066,159 A | | 11/1991 | Urbach ........................ 403/134 |
| 5,152,628 A | | 10/1992 | Broszat et al. .............. 403/140 |
| 5,564,853 A | * | 10/1996 | Maughan .................... 403/137 |
| 5,568,930 A | * | 10/1996 | Urbach ........................ 277/635 |
| 5,653,545 A | * | 8/1997 | Moormann et al. ........... 403/50 |
| 5,672,024 A | | 9/1997 | Maughan et al. ........... 403/141 |
| 5,678,947 A | * | 10/1997 | Urbach et al. .............. 403/288 |
| 6,010,271 A | * | 1/2000 | Jackson et al. ............. 403/131 |
| 6,042,294 A | * | 3/2000 | Urbach ........................ 403/135 |
| 6,149,337 A | * | 11/2000 | Newton et al. ............. 403/122 |
| 6,257,795 B1 | | 7/2001 | Stroh ......................... 403/131 |
| 6,325,389 B1 | * | 12/2001 | Sharify ....................... 277/604 |

(Continued)

*Primary Examiner*—Vishal Patel
(74) *Attorney, Agent, or Firm*—Mark W. Croll; Paul F. Donovan

(57) ABSTRACT

A ball socket ring seal for use with a ball joint assembly eliminates the need for a boot or bellows to protect the ball joint against the environment. The ball socket ring seal of the invention is positioned between the ball and the socket at the point of contact between the ball and socket. The ball socket ring seal not only provides a seal against the environment, it further functions as a wiper for the ball during articulation of the ball stud. The ball socket ring seal of the present invention reduces the weight and complexity of the ball joint assembly through the elimination of several parts, including the known boots or bellows, retainer rings, bands and clips.

13 Claims, 2 Drawing Sheets

U.S. PATENT DOCUMENTS

| | | | |
|---|---|---|---|
| 6,422,779 B1 * | 7/2002 | Spagnuolo | 403/138 |
| 6,439,795 B1 | 8/2002 | Lavery et al. | 403/134 |
| 6,502,993 B2 * | 1/2003 | Sasaki et al. | 384/145 |
| 6,530,711 B2 | 3/2003 | Menotti | 403/135 |
| 6,688,799 B2 | 2/2004 | Broker et al. | 403/135 |
| 6,875,388 B2 * | 4/2005 | Trotter et al. | 264/237 |
| 2001/0036385 A1 | 11/2001 | Menotti | 403/135 |
| 2002/0192016 A1 | 12/2002 | Monninghoff et al. | 403/122 |

* cited by examiner

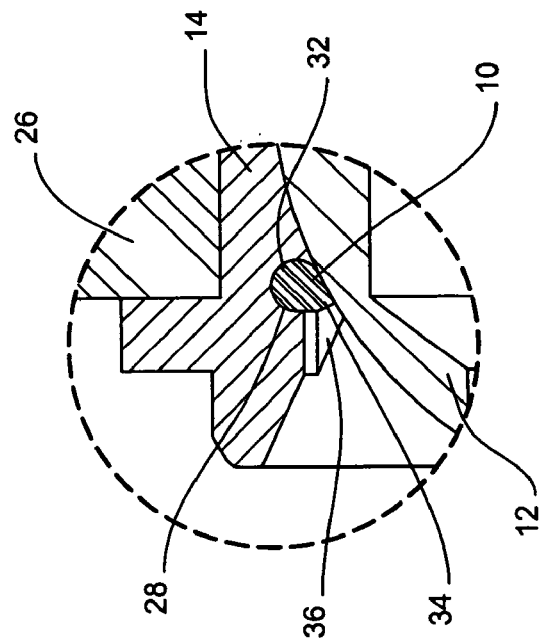
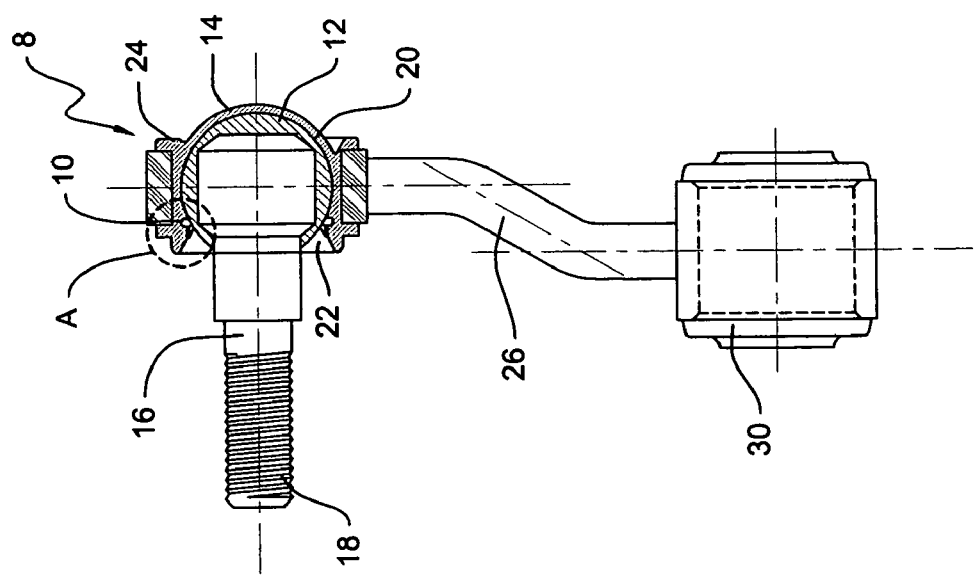
FIG. 4
FIG. 3

BALL SOCKET RING SEAL

CROSS REFERENCE TO RELATED APPLICATION

This Non-Provisional Application claims benefit to U.S. Provisional Application Ser. No. 60/501,284 filed Sep. 9, 2003.

FIELD OF THE INVENTION

The present invention relates generally to ball joints and, more particularly, to ball joints used in automobile applications.

BACKGROUND OF THE INVENTION

It is known to use ball joints for various automobile applications, including the wheel suspensions for automobiles. As an example, it is known to provide ball joints for linkage members adapted to connect one member, such as a strut arm or control arm, to a second member, such as a stabilizer bar. These known ball joints typically include a ball defining a ball stud, and a socket into which seats the ball. The socket will secure and hold the ball and ball stud in position yet permit rotational and pivotable movement of the ball and ball stud. The socket is generally formed in or mounted to a housing opening or similar structure. In addition, the known ball joints also include boots or sealing bellows to seal the ball joint, which is typically filled with a lubrication, such as joint grease, to protect the joint from contamination from the outside environment, e.g., water, salt, dirt, grit, etc. Retaining rings, bands, or clips are also used to secure the boots or sealing bellows over the ball joint and to assist in retaining the ball within the socket.

The known ball joints, however, have several drawbacks. For example, the boots or bellows used with the ball joints are generally made of rubber or a thermoplastic material, such as urethane, and consequently are a relatively expensive component in terms of the overall cost of the entire ball joint assembly. Another problem with known boots or bellows is the susceptibility of the boots or bellows to be punctured or otherwise damaged during handling or use, thereby limiting their ability to protect the joint from contamination from the surrounding environment. Yet another problem with known boots or bellows is that they can come into direct contact with the stud of the ball joint so as to be subject to wear from the steel degradation of the stud caused by the environment. Still another problem with known boots or bellows is that they can get caught or pinched with mating components of the ball stud during operation. Moreover, retaining rings, bands, or clips are needed to secure the known boots and bellows over the ball joints, thereby increasing the complexity and cost of the ball joint assembly. In addition to these drawbacks, other drawbacks and problems exist with respect to existing ball joints that are overcome by the present invention.

SUMMARY OF THE INVENTION

The present invention is directed to a ball socket ring seal that eliminates the need for boots or bellows to protect the ball joint against the environment even as the joint is articulated and used in service. The ball socket ring seal of the invention is positioned between the ball and the socket at the point of contact between the ball and socket. The ball socket ring seal of the invention provides a seal against the environment and further functions as a wiper for the ball during ball stud articulation, while staying stationary with respect to the socket. The ball socket ring seal of the invention may be used with any greaseless or greased ball joint assembly to prevent the ingress of contaminants into the ball joint.

Advantageously, the ball socket ring seal of the present invention reduces the weight and complexity of the ball joint assembly through the elimination of several parts, including the known boots or bellows, retainer rings, bands and clips. With the present invention, the ball socket ring seal cannot be punctured like the known boots or bellows and cannot be damaged during shipping due to inadvertent contact with the ball stud. In addition, the ball socket ring seal does not come into contact with the ball stud directly, and therefore is not subject to wear from the steel degradation of the ball stud in the environment. Moreover, the ring seal does not have any moving parts or folds to get pinched or caught with mating components or the ball stud during articulation. Further, the ball socket ring seal of the invention is generally less expensive than known boots or bellows resulting in a ball joint assembly that has an overall lower cost application.

Other features and advantages of the invention will become apparent to those skilled in the art upon review of the following detailed description, claims and drawings in which like numerals are used to designate like features.

BRIEF DESCRIPTION OF THE DRAWINGS

FIG. 3 is a partial section view of the ball joint assembly of FIG. 2 taken at line 3-3.

FIG. 4 is an enlarged cut-away view of FIG. 3 taken at view A.

Figure 2:
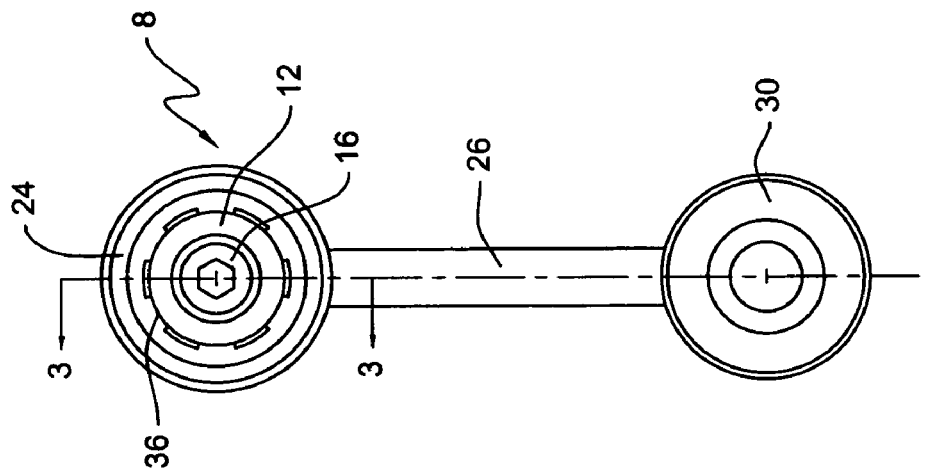
FIG. 2 is a front elevation view of the ball joint assembly of FIG. 1.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to FIGS. 1-4, a ball joint assembly 8 of the present invention is depicted and may be used for numerous applications, including automobile applications and the suspension systems for automobiles. The principles and teachings of the ball joint assembly 8 of the present invention, however, are not limited to the applications and uses depicted and described herein. Other uses and applications of the invention will be apparent to those skilled in the art.

Referring to FIGS. 3 and 4, the ball joint assembly 8 includes an exemplary ball socket ring seal 10 located between an exemplary ball 12 and an exemplary socket 14. The ball socket ring seal 10 is located at the point of contact between the ball 12 and socket 14. As illustrated in the Figures and described below, the ball socket ring seal 10 is secured and held stationary relative to the socket housing 24 and contacts only the ball 12. The ball socket ring seal 10 seals the joint between the ball 12 and socket 14 against the environment and serves as a wiper for the ball to clean the ball 12 during ball stud articulation.

The ball 12 is formed of an appropriate material, such as nylon, and includes an outwardly extending ball stud 16. The ball stud 16 is formed integral with the ball 12 and may further define a threaded end 18 for engaging with a mating threaded component or structure. One skilled in the art will understand that the end 18 may define other shapes and configurations that permit the mounting or securement of other components or structures to the ball stud 16. The ball stud 16 may be made of any suitable material such as metal or plastic, depending on the application. In an assembled position, the ball 12 and ball stud 16 will rotate and pivot relative to the socket 14.

In an exemplary embodiment, the socket 14 defines a spherical cavity 20 that mounts the ball 12. The socket 14 further defines an opening 22 through which extends the ball stud 16. The socket 14 substantially envelops the ball 12 to capture and retain the ball 12 yet still permit the ball 12 to rotate and pivot within the socket 14. The degree of pivot of the ball 12 and ball stud 16 will be dependent on the size of the opening 22. In other words, the larger the opening 22 the greater the degree of pivot of the ball 12 and ball stud 16. Likewise, the smaller the opening 22 the lesser the degree of ball 12 and ball stud 16 pivot.

In an exemplary embodiment, the socket 14 defines a socket housing 24. As illustrated in FIG. 4, the socket housing 24 defines a recessed channel 28 that, as described below, is formed through the molding of the socket housing 24 around the ring seal 10 to secure the ring seal 10 in position. Alternatively, the seal 10 can be assembled into a recessed channel 28 that is molded into the socket housing 24. In the embodiment depicted in FIGS. 2 and 4, the recessed channel 28 defines a wall 36 that further defines a plurality of crenellations for holding and securing the ring seal 10 within the channel 28 during operation of the ball joint assembly 8. Other suitable configurations can be used to hold and secure the ring seal 10 within the channel 28.

As depicted in FIG. 4, the ring seal 10 is positioned in close proximity to the opening 22 and extends radially toward and in contact with the ball 12. In this configuration, the ring seal 10 will seal the socket 14 and thus the point of contact between the ball 12 and socket 14 to prevent outside contaminants from entering the socket 14. In addition, upon movement or pivoting of the ball 12, the ring seal 10 will also serve as a wiper to clean the ball 12 of any contaminants on the ball 12. More specifically, the exemplary ring seal 10 defines an outer peripheral portion 32 and an inner portion 34. In an assembled position, the outer peripheral portion 32 is secured within the channel 28 and will be held in a stationary position relative to the socket housing 24. The inner portion 34 contacts the ball 12 to prevent the entry of contaminants into the socket 14 and to serve as a wiper to clean the ball 12 during articulation of the ball stud 16. The ring seal 10 of the invention is formed from an appropriate material, such as Teflon™, rubber or a thermoplastic material, such as urethane, and may have various cross-sectional shapes including the illustrated tear drop shape, an O-shape, an X-shape, or any number of different shapes that permit the sealing of the socket 14 and the wiping of the ball 12 during use. One skilled in the art will understand that the present invention is not limited to the depicted or described ring seal shapes as numerous other shapes may be used with the principles and teachings of the present invention.

Figure 1:
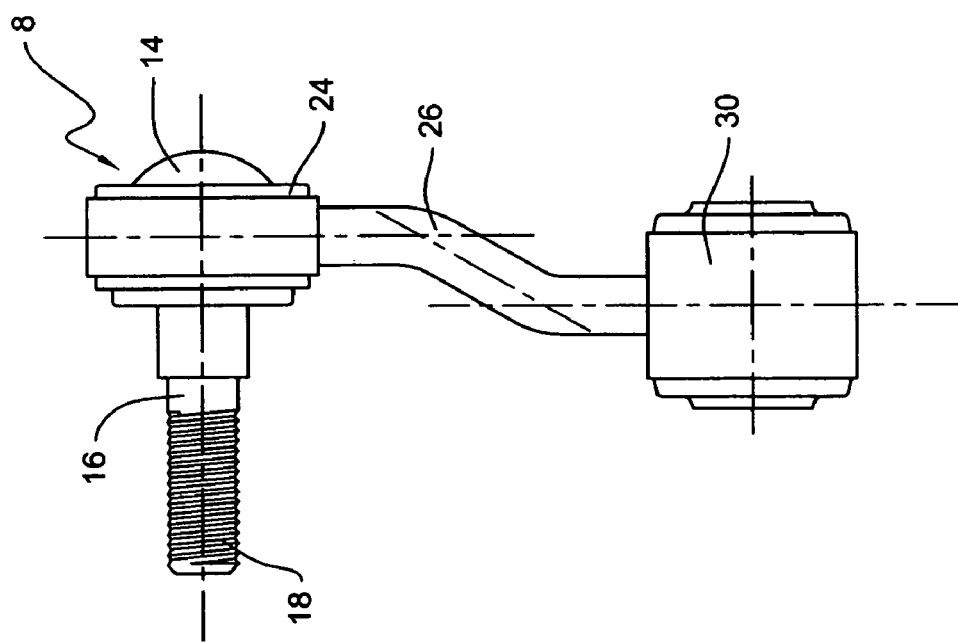
FIG. 1 is a side elevation view of a ball joint assembly of the present invention.

As depicted in FIGS. 1-3, in an exemplary embodiment, the socket housing 24 may be formed integral with or mounted to other components, such as the depicted linkage arm 26. The linkage arm 26 is made of a suitable material, such as steel, plastic or aluminum, and may be further connected to other components, such as a bushing 30 or the like, depending on the desired application.

The ball joint assembly 8 of the present invention may be manufactured and assembled as follows. First, the linkage arm 26 is formed of a suitable material such as steel, plastic or aluminum, the ball 12 is formed of an appropriate material such as nylon, and the ring seal 10 is also formed of an appropriate material such as Teflon™, rubber or a thermoplastic material. Next, the ring seal 10, ball 12, and linkage arm 26 are placed into a mold which forms the socket 14. The socket mold is adapted to receive the ring seal 10. During the molding of the socket 14, the ball 12 assists in holding the ring seal 10 in position. The ring seal 10 will not bond with the ball during the molding of the socket 14. Finally, the socket 14 and socket housing 24 is molded about the ball 12 and the ring seal 10, resulting in the ball joint assembly 8. One skilled in the art will understand that other methods of manufacturing and assembling the ball joint assembly are possible with the principles and teachings of the present invention.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A ball joint assembly comprising:

an arm member, a socket housing, the socket housing defining a spherical cavity and a recessed channel, the spherical cavity having an end which is directly connected to an end of the recessed channel, the socket housing being integrally connected to the arm member such that the socket housing is fixed relative to the arm member so as not to move with respect thereto, a ball received within the socket housing, the ball defining an outwardly extending ball stud, the ball being positioned within the spherical cavity of the socket housing, and a ring seal having a continuous, annular shape, an outer peripheral portion and an uninterrupted inner portion, the ring seal being made of a single material having a solid cross-sectional shape, the ring seal being positioned between the socket housing and the ball, the ring seal being securely captured within the recessed channel so as to prevent any substantial sliding movement with respect to the socket housing, the outer peripheral portion of the ring seal being secured within the recessed channel and held in a stationary position relative to the socket housing, and the ring seal extending radially toward and in contact with the ball such that a surface of the inner portion of the ring seal remains in constant contact with the ball, wherein the spherical cavity defines an opening at only one end thereof through which extends the ball stud, and wherein, except for the opening, the spherical cavity is closed to substantially envelope the ball yet still permit the ball to rotate and pivot within the socket housing for pivotal and rotational movement with respect to the arm member, and wherein the closed spherical cavity defines a smooth, continuous, uninterrupted spherical inner surface.

2. The ball joint assembly as set forth in claim 1, wherein the recessed channel is positioned adjacent to the ball.

3. The ball joint assembly as set forth in claim 2, wherein the ring seal defines an outer peripheral edge that is secured within the recessed channel and an inner edge that contacts the ball.

4. The ball joint assembly as set forth in claim 2, wherein the recessed channel defines a wall further defining crenellations for securing the ring seal within the recessed channel.

5. The ball joint assembly as set forth in claim 3, wherein the ring seal defines a cross-sectional shape selected from the group consisting of a tear-drop shape, O-shape, and X-shape.

6. A ball joint assembly comprising:

an arm member, a socket housing, the socket housing forming a spherical cavity and ddefining a recessed channel, the spherical cavity having an which is directly connected to an end of the recessed channel, the socket housing being integrally connected to the arm member such tat the socket housing is fixed relative to the arm member so as not to move with respect thereto, a ball received within the spherical cavity of the socket housing, the ball defining an outwardly extending ball stud, the ball being positioned within the spherical cavity of the socket housing, and a ring seal having a continuous, annular shape, art outer peripheral portion and ant uninterrupted inner portion, the ring seal being made of a single material having a solid cross-sectional shape, the ring seal being positioned between the socket housing and the ball, the ring seal being securely received within the recessed channel so as to prevent any substantial sliding movement with respect to the socket housing, the outer peripheral portion of the ring seal being secured within the recessed channel and held in a stationary position relative to the socket housing, and the ring seal contacting the ball such that a surface of the inner portion of the ring seal remains in constant contact with the ball, wherein the spherical cavity defines an opening at only one end thereof through which extends the ball stud, and wherein, except for the opening, the spherical cavity is closed to substantially envelope the ball yet still permit the ball to rotate and pivot within the socket housing for pivotal and rotational movement with respect to the arm member, and wherein the closed spherical cavity defines a smooth, continuous, uninterrupted spherical inner surface.

7. The ball joint assembly as set forth in claim 6, wherein the recessed channel is positioned adjacent to the ball.

8. The ball joint assembly as set forth in claim 7, wherein the ring seal defines an outer peripheral edge that is secured within the recessed channel and an inner edge that contacts the ball.

9. The ball joint assembly as set forth in claim 8, wherein the recessed channel defines a wall further defining crenellations for securing the ring seal within the recessed channel.

10. The ball joint assembly as set forth in claim 9, wherein the ring seal defines a cross-sectional shape selected from the group consisting of a tear-drop shape, O-shape, and X-shape.

11. A ball joint assembly comprising:

an arm member, a socket housing, the socket housing forming a spherical cavity and having a recessed channel, the spherical cavity having an end which is directly connected to an end of the recessed channel, the socket housing being integrally connected to the arm member such that the socket housing is fixed relative to the arm member so as not to move with respect thereto, a ball received within the spherical cavity of the socket housing, the ball defining an outwardly extending ball stud, the ball being positioned within the socket housing, and a ring seal having a continuous, annular shape, an outer peripheral portion and an uninterrupted inner portion, wherein the ring seal defines cross-sectional shape selected from the group consisting of a tear-drop shap; O-shape, hnd X-sbape, the ring seal being positioned between the socket housing and the ball in the recessed channel, the ring seal being securely molded to the socket housing so as to prevent any substantial sliding movement with respect to the socket housing, the outer peripheral portion of the ring seal being secured and held in a stationary position relative to the socket housing, and the ring seal contacting the ball such that a surface of the inner portion of the ring seal remains in constant contact with the ball, wherein the spherical cavity defines an opening at only one end thereof through which extends the ball stud, and wherein, except for the opening, the spherical cavity is closed to substantially envelope the ball yet slill permit the ball to rotate and pivot within the socket housing for pivotal and rotational movement with respect to the arm member, and wherein the closed spherical cavity defines a smooth, continuous, uninterrupted spherical inner surface.

12. The ball joint assembly as set forth in claim 11, wherein the ring seal defines an outer peripheral edge and an inner edge, the inner edge extending toward and in contact with the ball.

13. The ball joint assembly as set forth in claim 1, wherein the ring seal is made from the group consisting of a fluoropolymer material, plastic, rubber, thermoplastic and urethane.

* * * * *